United States Patent [19]

Kopis

[11] 4,156,874
[45] May 29, 1979

[54] ANTI-COLLISION VEHICLE RADAR SYSTEM

[76] Inventor: Floyd B. Kopis, 330 Interstate Rd., Addison, Ill. 60101

[21] Appl. No.: 853,032

[22] Filed: Nov. 21, 1977

[51] Int. Cl.² .................... H01Q 21/24; G01S 9/02
[52] U.S. Cl. ...................... 343/7 VM; 343/100 PE
[58] Field of Search ................... 343/7 VM, 100 PE

[56] References Cited

U.S. PATENT DOCUMENTS 3,757,325 9/1973 Sato et al. .................... 343/7 VM
3,781,879 12/1973 Staras et al. ............... 343/100 PE X Primary Examiner—T. H. Tubbesing
Attorney, Agent, or Firm—Burmeister, York, Palmatier, Hamby & Jones

[57] ABSTRACT

The anti-collision vehicle radar system overcomes interference problems due to radar beams from similar radar systems on other vehicles by providing a radar transmitter having a transmitting antenna which transmits a radar beam having circular polarization with a particular direction of rotation of the polarization, a radar receiver for receiving the radar beam after reflection thereof and including a receiving antenna having means for discriminating in favor of received signals having circular polarization with said particular direction of rotation while discriminating against received signals having circular polarization with the opposite direction of rotation of the polarization, the receiving antenna thereby being effective to discriminate in favor of a reflected radar beam from the associated transmitting antenna while discriminating against any interfering radar beam from another vehicle radar system, and utilization means connected to the receiver for utilizing received radar signals to control the operation of the vehicle. For example, the brakes of the vehicle may be applied if the received radar signals indicate that the vehicle must be stopped to avoid a collision. The transmitting and receiving antennas may include helical antenna elements which are coiled in opposite directions to achieve such discrimination.

9 Claims, 4 Drawing Figures

ANTI-COLLISION VEHICLE RADAR SYSTEM

This invention relates to an anti-collision vehicle radar system, adapted to control the operation of a vehicle, so as to avoid collisions with other vehicles and with obstacles of all kinds.

The radar system is applicable to vehicles generally, including passenger automobiles, trucks, buses, rapid transit trains, and all other types of railroad trains, for example.

Many such anti-collision vehicle radar systems have been proposed in the prior art. Typically, such an anti-collision radar system includes a radar transmitter, a transmitting antenna mounted on the vehicle for transmitting a radar beam in a forward direction from the vehicle, and a radar receiver for receiving the reflected radar beam, after it has been reflected by another vehicle or any other obstacle. The radar system may include means for measuring the range or distance between the vehicle and the obstacle, and also the rate or velocity with which the vehicle is approaching the obstacle. The radar system may include means for automatically actuating the brakes of the vehicle, if the range and velocity information indicates that it is necessary to stop or slow down the vehicle to avoid a collision with the obstacle.

Prior anti-collision vehicle radar systems have been afflicted with the problem of interference from radar beams transmitted by similar radar systems on other vehicles. An anti-collision radar system is not of much value unless radar units can be installed on all vehicles, without causing interference problems between the radar units on approaching vehicles. With prior radar systems, the radar units on approaching vehicles have severely interfered with each other, in that each radar receiver has been blinded or overloaded by the strong radar beam from the approaching vehicle, to such an extent that each radar receiver has been rendered incapable of effectively receiving the weaker reflected beam from its own transmitter.

The principal object of the prevent invention is to provide a new and improved anti-collision vehicle radar system which is capable of discriminating in favor of the reflected radar beam, while discriminating against any radar beam from a similar radar system on another vehicle, so that the radar system can effectively receive and analyze the reflected beam, without being blinded by any radar beam from another vehicle.

In accordance with the present invention, this objective is achieved by providing radar transmitting means for transmitting a radar beam having circular polarization with a particular directtion of rotation of the polarization, radar receiving means for receiving the beam after reflection thereof and including means for discriminating in favor of received signals having circular polarization with such particular direction of rotation, while discriminating against received signals having circular polarization with the opposite direction of rotation of the polarization, and utilization means connected to the receiving means for utilizing received radar signals to control the operation of the vehicle. In this way, the receiving means is effective to discriminate in favor of the reflected radar beam while discriminating against any interfering radar beam from another vehicle radar system. The transmitted radar beam, with its circular polarization, is reflected from obstacles without any change in the direction of rotation of the polarization. However, the circularly polarized beam from an approaching vehicle is received with the opposite direction of rotation of the polarization, due to the fact that the orientation of the approaching vehicle is reversed relative to the orientation of the base vehicle.

To produce the circularly polarized radar beam, the radar transmitter may employ transmitting antenna means having a coiled antenna element. The receiving antenna means may employ an antenna element which is coiled in the opposite direction, to discriminate against any interfering radar beam. The transmitting and receiving antenna elements are preferably helical in shape, with opposite coiling directions. The helical antenna elements have the additional advantage of being highly directional, so as to produce a narrow beam width.

Further objects, advantages and features of the present invention will appear from the following description, taken with the accompanying drawings, in which.

Figure 1:
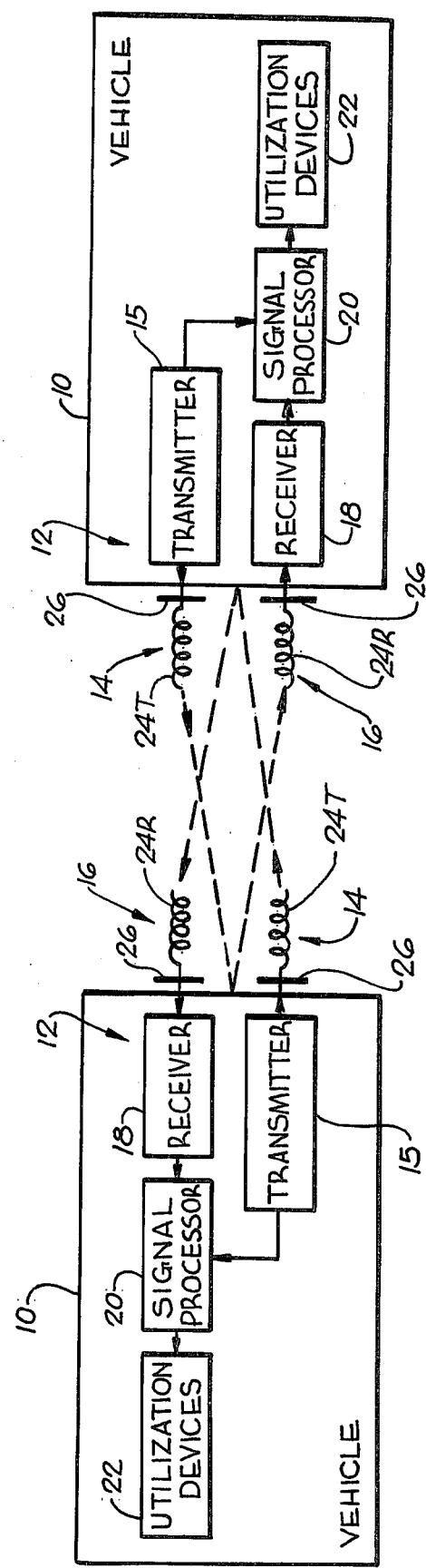
FIG. 1 is a diagrammatic plan view showing two approaching vehicles equipped with anti-collision radar systems to be described as illustrative embodiments of the present invention.

FIG. 1 illustrates two identical vehicles 10 having identical radar systems 12, to be described as illustrative embodiments of the present invention. Each radar system 12 comprises radar transmitting means including a helical transmitting antenna 14 connected to a radar transmitter 15. Each radar system 12 also comprises receiving means including a helical receiving antenna 16 connected to a radar receiver 18, the output of which is connected to a signal processor 20, adapted to operate utilization devices 22 for controlling the operation of the vehicle. The transmitter 15, receiver 18, signal processor 20 and utilization devices 22 may employ the technology of the prior art, or any other suitable technology.

As shown, the helical transmitting and receiving antennas 14 and 16 comprise helical coils 24T and 24R, which are mounted in front of metal plates 26 serving as reflectors. The transmitting antenna 14 of each radar system 12 radiates a circularly polarized radar beam in which the polarization rotates in a particular direction, which may be either clockwise or counterclockwise, but is the same for all of the radar systems on all vehicles. This radar beam is reflected by any obstruction and is returned with the same absolute direction of rotation of the polarization. The receiving antenna 16 is constructed so as to discriminate in favor of this direction of rotation.

If two vehicles are approaching each other while travelling in opposite directions, as illustrated in FIG. 1, each radar system will receive any interfering radar beam from the system on the other vehicle, in addition to its own reflected beam. The interfering beam has a circular polarization which is rotating in the opposite direction, because the interfering beam is being viewed from the receiving end of the beam rather than from the transmitting end. Thus, if each radar system is transmitting a radar beam with clockwise polarization, the interfering beam from another vehicle headed or oriented in the opposite direction is received with a counterclockwise polarization, while its own reflected beam is received with a clockwise polarization. The receiving antenna 16 of each radar system is then constructed so as to discriminate against the counterclockwise polarization of the interfering beam, while discriminating in favor of the clockwise polarization of the reflected beam. In this way, the interfering beam can be rejected or attenuated by as much as 40 D.B., relative to the reflected beam, so that each radar system will be able to distinguish between the reflected beam and the interfering beam. Thus, each radar system is able to receive, analyze and measure its own reflected beam, without being blinded, overloaded or confused by an interfering beam.

To achieve the desired discrimination, the helical receiving antenna element 24R should be coiled in the opposite direction, relative to the coiling direction of the transmitting antenna element 24T. The opposite coiling directions are illustrated in FIG. 1. Except for the opposite coiling directions, the transmitting and receiving antennas 14 and 16 may be basically the same.

Figure 3:
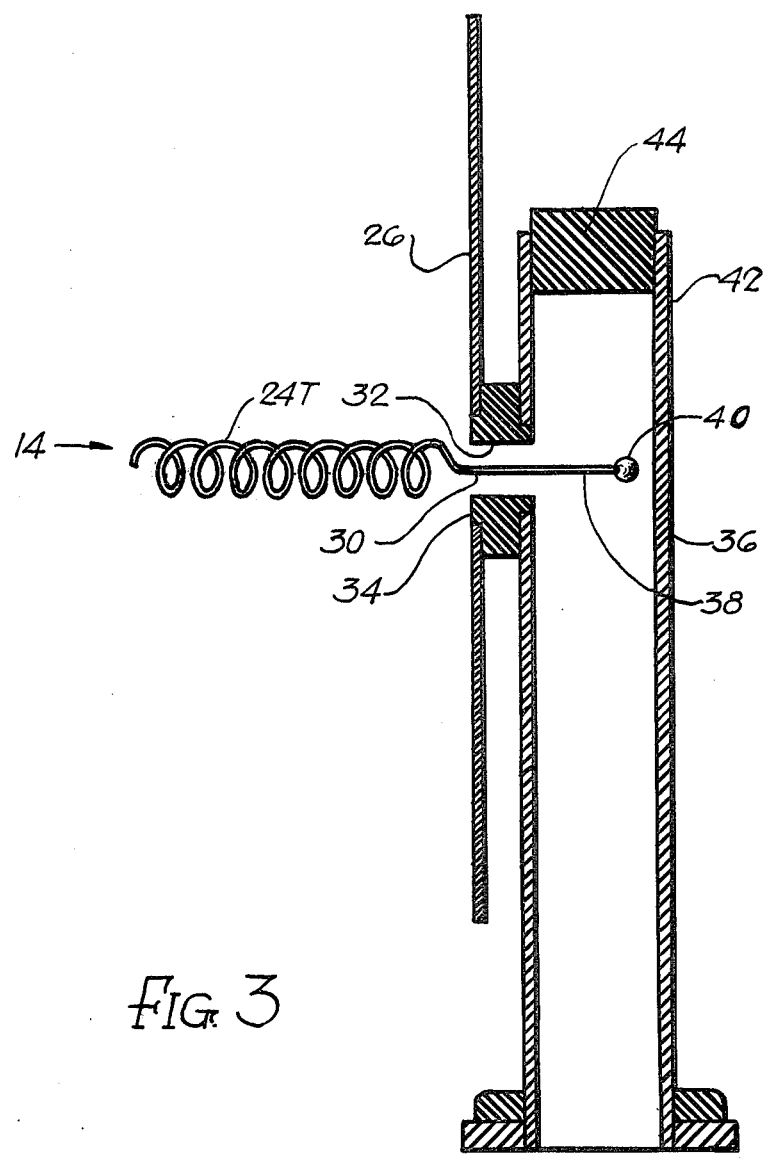
FIG. 3 is a more detailed sectional view showing a similar helical antenna, but with an opposite coiling direction.
Figure 2:
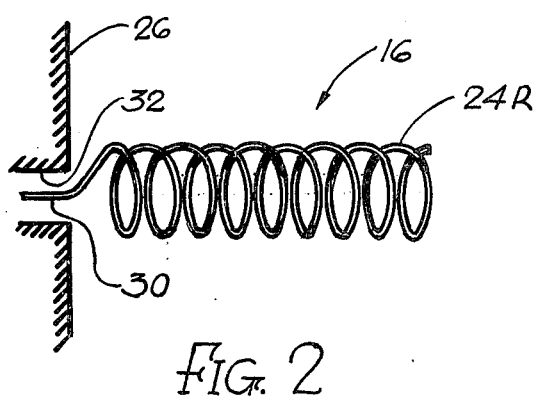
FIG. 2 is a diagrammatic sectional view showing a helical radar antenna which may be employed in the radar system.
Figure 4:
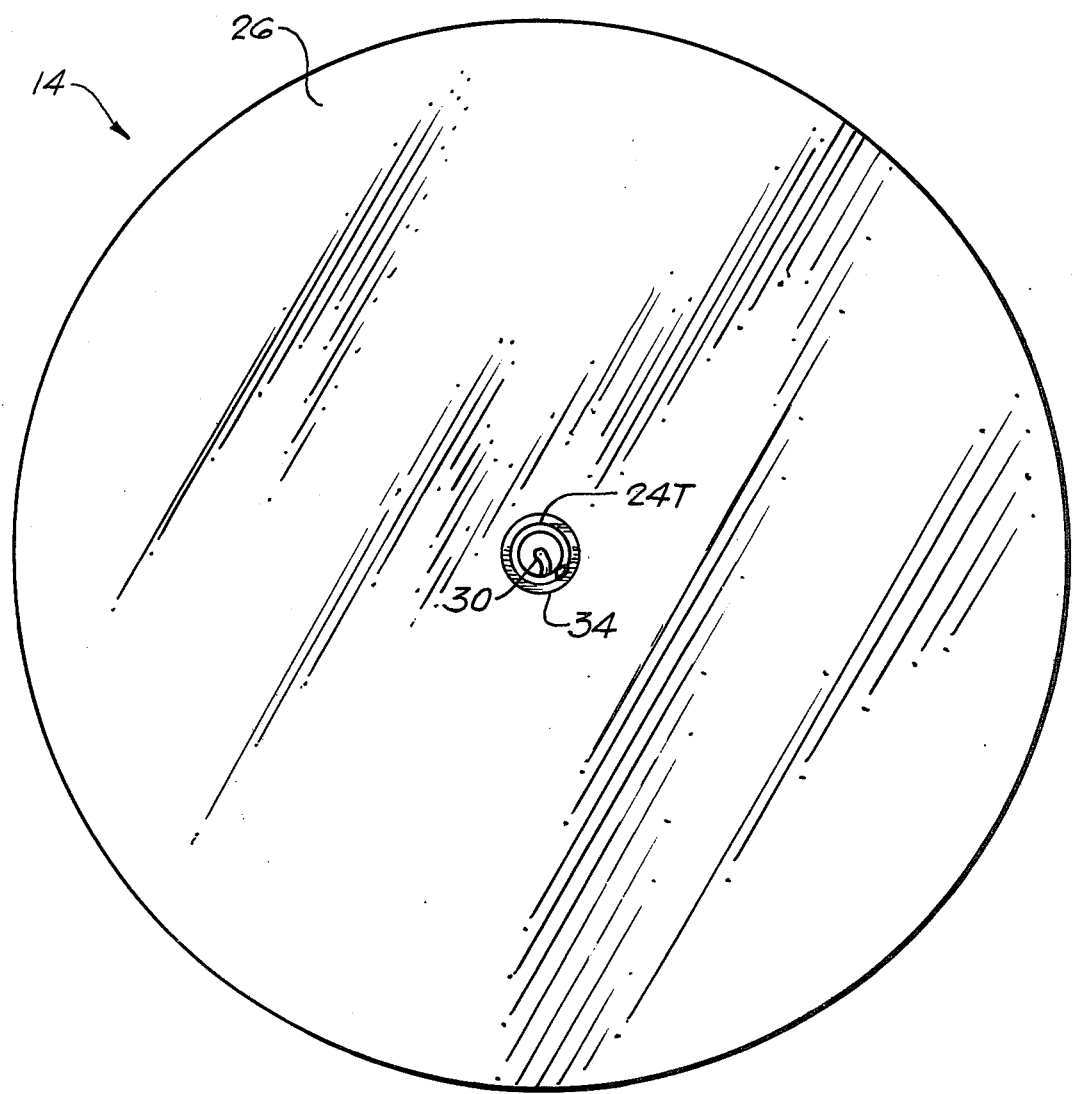
FIG. 4 is a front view of the helical antenna of FIG. 3.

Additional details of the transmitting and receiving antennas 14 and 16 are shown in FIGS. 2, 3 and 4. FIG. 2 is diagrammatic, while FIG. 3 is more detailed. It may be considered that FIG. 2 illustrates the receiving antenna 16, while FIGS. 3 and 4 illustrate the transmitting antenna 14. It will be noted that the opposite coiling directions are employed for the helical receiving antenna element 24R and the helical transmitting antenna element 24T. In each case, the axis of the coil 24R and 24T coincides with the desired direction of propagation. The conductive reflector plate 26 is perpendicular to the axis of the helical coil 24T or 24R.

In each case, the antenna coil 24T or R is fed by forming one end of the coil into an axial lead 30 which may be coupled to a coaxial line or a wave guide. As shown in FIG. 3, the lead 30 extends axially through a cylindrical bore 32 in a cylindrical conductor 34, into a wave guide 36. Within the wave guide 36, the end of the lead 30 serves as a probe 38, terminating in a ball 40 which is for the purpose of broad band matching. The wave guide 36 may be employed to supply energy to or from the antenna 14 or 16. The illustrated wave guide 36 has a tuning stub 42 in which a conductive tuning slug 44 is slidable. Any known or suitable wave guide or other feed technology may be employed. The antenna element 24T or R may be tuned by adjusting the length or position of the lead 30.

The helical transmitting and receiving antennas 14 and 16 have the additional advantage of being highly directional, so as to provide a narrow beam width. In this way, interference is reduced and the strength of the reflected beam is increased.

The helical transmitting antenna 14 radiates electromagnetic radio waves having circular polarization. Other types of antennas may be employed to radiate waves having circular polarization. For example, other types of coiled antenna elements may be employed, such as spiral coils.

In a circularly polarized wave, the transverse polarization of the wave rotates. In the case of the helical transmitting antenna 14, the direction of rotation depends upon the coiling direction of the helical coil. A circularly polarized wave may be regarded as comprising two wave components which are 90° out of phase electrically and are polarized along transverse planes which are 90° apart, such as horizontal and vertical planes. The two wave components combine to form a wave which is circular or rotary. The rotation of the polarization may be in either direction about the axis of propagation of the wave.

The radar system of the present invention may be operated at various radio frequencies, but it is particularly advantageous to operate the radar system at extreme ultra-high frequencies, such as the so called X band at about 10 gigahertz. In this band, a high degree of directionality can be achieved with small antennas. Thus, the helical transmitting and receiving antennas 14 and 16 will achieve an extremely narrow beam width.

Any known or suitable radar technology may be employed to analyze and measure the reflected radar signals. Thus, technology is available to measure the range or distance between the vehicle and the obstruction, and also the relative speed or velocity between the vehicle and the obstacle. The radar system may be programmed to operate the brakes of the vehicle automatically, if the range and velocity information indicate that there is danger of a collision between the vehicle and the obstacle. Other controls of the vehicles can also be operated, if desired.

With the radar system of the present invention, every automobile and every other automotive vehicle can be equipped with a radar set to prevent any vehicle from colliding with another vehicle or any other obstacle. The radar sets on approaching vehicles will not interfere with one another, because each radar set is able to discriminate in favor of its own reflected beam, while discriminating against the beam from an oncoming vehicle. This discrimination results from the circular polarization of the transmitted radar beams, plus the ability of the receiving antennas to discriminate in favor of circular polarization in one direction of rotation, while discriminating against circular polarization in the opposite direction of rotation.

I claim:
1. An anti-collision vehicle radar system, comprising
   radar transmitting means including a transmitting antenna including transmitting antenna means for transmitting a radar beam having circular polarization with a particular direction of rotation of the polarization,
   radar receiving means for receiving said beam after reflection thereof and including a receiving antenna including receiving antenna means for discriminating in favor of received signals having circular polarization with said particular direction of rotation while discriminating against received signals having circular polarization with the opposite direction of rotation of the polarization,
   said system thereby being effective to discriminate in favor of a reflected radar beam from said transmitting means while discriminating against any interfering radar beam received directly from another similar vehicle radar system,
   and utilization means connected to said receiving means for utilizing received radar signals to control the operation of a vehicle.
2. An anti-collision vehicle radar system according to claim 1,
   in which said transmitting antenna means includes a helical transmitting antenna element which is coiled in one direction,
   said receiving antenna means including a helical receiving antenna element which is coiled in the opposite direction.

3. An anti-collision vehicle radar system according to claim 1, in which said transmitting antenna means includes an antenna element coiled in one direction, said receiving antenna means including an antenna element coiled in the opposite direction.

4. An anti-collision vehicle radar system, comprising
transmitting means for transmitting a radar beam having circular polarization with a particular direction of rotation of the polarization,
radar receiving means for receiving the radar beam after reflection thereof and including means for discriminating in favor of received signals having circular polarization with said particular direction of rotation while discriminating against received signals having circular polarization with the opposite direction of rotation of the polarization,
said system thereby being effective to discriminate in favor of a reflected radar beam from said transmitting means while discriminating against any interfering radar beam received directly from another similar vehicle radar system,
and utilization means connected to said receiving means for utilizing received radar signals to control the operation of a vehicle.

5. An anti-collision vehicle radar system according to claim 4,
in which said transmitting means includes a helically coiled transmitting antenna element coiled in one direction,
said receiving means including a helically coiled receiving antenna element coiled in the opposite direction.

6. An anti-collision vehicle radar system according to claim 4,
in which said transmitting means includes a coiled transmitting antenna element coiled in one direction,
said receiving means including a coiled receiving antenna element coiled in the opposite direction.

7. An anti-collision vehicle radar system, comprising
radar transmitting means including transmitting antenna means for transmitting a radar beam having circular polarization with a particular direction of rotation of the polarization,
and radar receiving means for receiving said beam after reflection thereof and including receiving antenna means for discriminating in favor of received signals having circular polarization with said particular direction of rotation while discriminating against received signals having circular polarization with the opposite direction of rotation of the polarization,
said system thereby being effective to discriminate in favor of a reflected radar beam from said transmitting means while discriminating against any interfering radar beam received directly from another similar vehicle radar system.

8. An anti-collision vehicle radar system according to claim 7,
in which said transmitting antenna means icnludes a helical transmitting antenna element which is coiled in one direction,
said receiving antenna means including a helical receiving antenna element which is coiled in the opposite direction.

9. An anti-collision vehicle radar system according to claim 7,
in which said transmitting antenna means includes an antenna element coiled in one direction,
said receiving antenna means including an antenna element coiled in the opposite direction.

* * * * *